(12) United States Patent
Oblinger et al.

(10) Patent No.: US 11,313,329 B2
(45) Date of Patent: Apr. 26, 2022

(54) COOLING DEVICE FOR A FLOW SENSOR IN AN EXHAUST GAS RECIRCULATION LINE

(71) Applicant: FAURECIA SYSTEMES D'ECHAPPEMENT, Nanterre (FR)

(72) Inventors: Benjamin Oblinger, Lyoffans (FR); Thierry Marimbordes, Essert (FR); Jonathan Canteloube, Belfort (FR); Mamadou Diouf, Bessoncourt (FR); Ronan Botella, Chevremont (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 17/108,238

(22) Filed: Dec. 1, 2020

(65) Prior Publication Data

US 2021/0172404 A1 Jun. 10, 2021

(30) Foreign Application Priority Data

Dec. 5, 2019 (FR) ..................... 19 13786

(51) Int. Cl.
*F02M 26/23* (2016.01)
*F02M 26/12* (2016.01)
*F02M 26/21* (2016.01)
*F02M 26/47* (2016.01)

(52) U.S. Cl.
CPC ............ *F02M 26/23* (2016.02); *F02M 26/12* (2016.02); *F02M 26/21* (2016.02); *F02M 26/47* (2016.02)

(58) Field of Classification Search
CPC ........ F02M 26/23; F02M 26/12; F02M 26/21; F02M 26/47; F02M 26/11; F02M 26/18; F02M 35/10249; Y02T 10/40; G01F 1/66; F02D 2400/18; F02D 2041/0075; F02D 41/0072

See application file for complete search history.

(56) References Cited

U.S. PATENT DOCUMENTS

| 5,609,143 | A  | * | 3/1997 | Schellenberg | ......... F02M 26/18 123/568.18 |
| 7,320,220 | B1 | * | 1/2008 | Atkinson | .................. G01F 1/50 60/605.2 |
| 9,926,891 | B2 |   | 3/2018 | Zurlo et al. | |

(Continued)

FOREIGN PATENT DOCUMENTS

| EP | 0486338 A1 | 5/1992 |
| EP | 2868909 A1 | 5/2015 |
| FR | 2909726 A1 | 6/2008 |

OTHER PUBLICATIONS

French Preliminary Research Report for French Patent Application No. 1913786 dated Apr. 24, 2020.

*Primary Examiner* — Xiao En Mo

(74) *Attorney, Agent, or Firm* — Carlson, Gaskey & Olds, P.C.

(57) ABSTRACT

A cooling device includes a case delimiting an air circulation enclosure. The case comprises an air intake opening intended to be connected to an air inlet, and an air outlet opening intended to be connected to a heat engine. The cooling device includes an exhaust gas driving device housed at least partially in the air circulation enclosure. The exhaust gas driving device includes at least one exhaust gas flow sensor, each flow sensor being housed entirely in the air circulation enclosure of the case.

17 Claims, 5 Drawing Sheets

(56) References Cited

U.S. PATENT DOCUMENTS

| | | | |
|---|---|---|---|
| 2008/0178853 A1* | 7/2008 | Yamaoka | F02M 26/49 |
| | | | 123/568.11 |
| 2009/0223495 A1* | 9/2009 | Ohata | F02M 26/47 |
| | | | 123/568.12 |
| 2012/0042850 A1* | 2/2012 | Haskara | F02D 41/107 |
| | | | 123/305 |
| 2018/0128145 A1* | 5/2018 | Uhrich | F01N 1/168 |

* cited by examiner

COOLING DEVICE FOR A FLOW SENSOR IN AN EXHAUST GAS RECIRCULATION LINE

CROSS-REFERENCE TO RELATED APPLICATIONS

This application is a U.S. non-provisional application claiming the benefit of French Application No. 19 13786, filed on Dec. 5, 2019, which is incorporated herein by reference in its entirety.

TECHNICAL FIELD

The present disclosure relates to a cooling device for a flow sensor of a recirculated exhaust gas from a heat engine.

BACKGROUND

Such a cooling device is generally used in conjunction with an exhaust gas recirculation line. An exhaust gas recirculation line is intended to redirect part of the exhaust gases of a combustion engine toward an intake manifold of this engine, in order to reduce the emissions of nitrogen oxides NOx for diesel engines and the $CO_2$ emissions for gasoline engines.

The quantity of exhaust gas redirected into the recirculation line is regulated by a flow regulating valve, and the exhaust gas flow rate in the recirculation line is measured by at least one flow sensor equipping the driving device.

SUMMARY

The disclosure, in particular, aims to improve the behavior of the flow sensor.

The disclosure in particular relates to a cooling device for at least one flow sensor for recirculated exhaust gases from a heat engine, wherein the cooling device includes a case delimiting an air circulation enclosure. The case comprises an air intake opening intended to be connected to an air inlet, and an air outlet opening intended to be connected to the heat engine. The cooling device includes an exhaust gas driving device housed at least partially in the air circulation enclosure, the exhaust gas driving device including at least one exhaust gas flow sensor, with each flow sensor being housed entirely in the air circulation enclosure of the case.

The sensors of the state of the art being intended to measure the exhaust gas flow rates, they are generally subject to high temperatures (which are on the one hand the temperature of the recirculated exhaust gases and on the other hand the ambient temperature in the engine compartment). Now, it has been noted that the behavior of the flow sensors decreases when the temperature becomes too high, in particular above 100° C.

The disclosure aims to cool the flow sensors at a lower cost and effectively.

By housing the flow sensors entirely in the air circulation enclosure of the cooling case, these flow sensors are cooled by the air circulating in this cooling case. Their lifetime is improved as a result.

A cooling device according to the disclosure may further include one or more of the following features, considered alone or according to all technically possible combinations.

Each flow sensor is formed by an ultrasonic transmitter or an ultrasonic receiver.

The driving device includes a flow regulating valve, the regulating valve being housed inside the enclosure of the case.

The driving device includes a flow regulating valve, the regulating valve being housed outside the enclosure of the case, upstream or downstream of this case.

The flow regulating valve is arranged upstream of each flow sensor.

The flow regulating valve is arranged downstream of each flow sensor.

The driving device includes a tubular exhaust gas circulation pipe, which is connected to the case by fitting in a receiving orifice of the tubular pipe.

The cooling device includes a downstream pipe connected to the outlet opening, the circulation pipe passing through the enclosure and being extended by an outlet pipe opening into the downstream pipe.

The circulation pipe opens into the enclosure.

The disclosure also relates to an air intake line, including an air inlet, wherein the air intake line includes a cooling device as previously defined, the air intake opening of which is connected to the air inlet.

BRIEF DESCRIPTION OF THE DRAWINGS

Various aspects and advantages of the disclosure will the highlighted in the following description, provided solely as an example and done in reference to the appended figures, in which.

DETAILED DESCRIPTION

Figure 1:
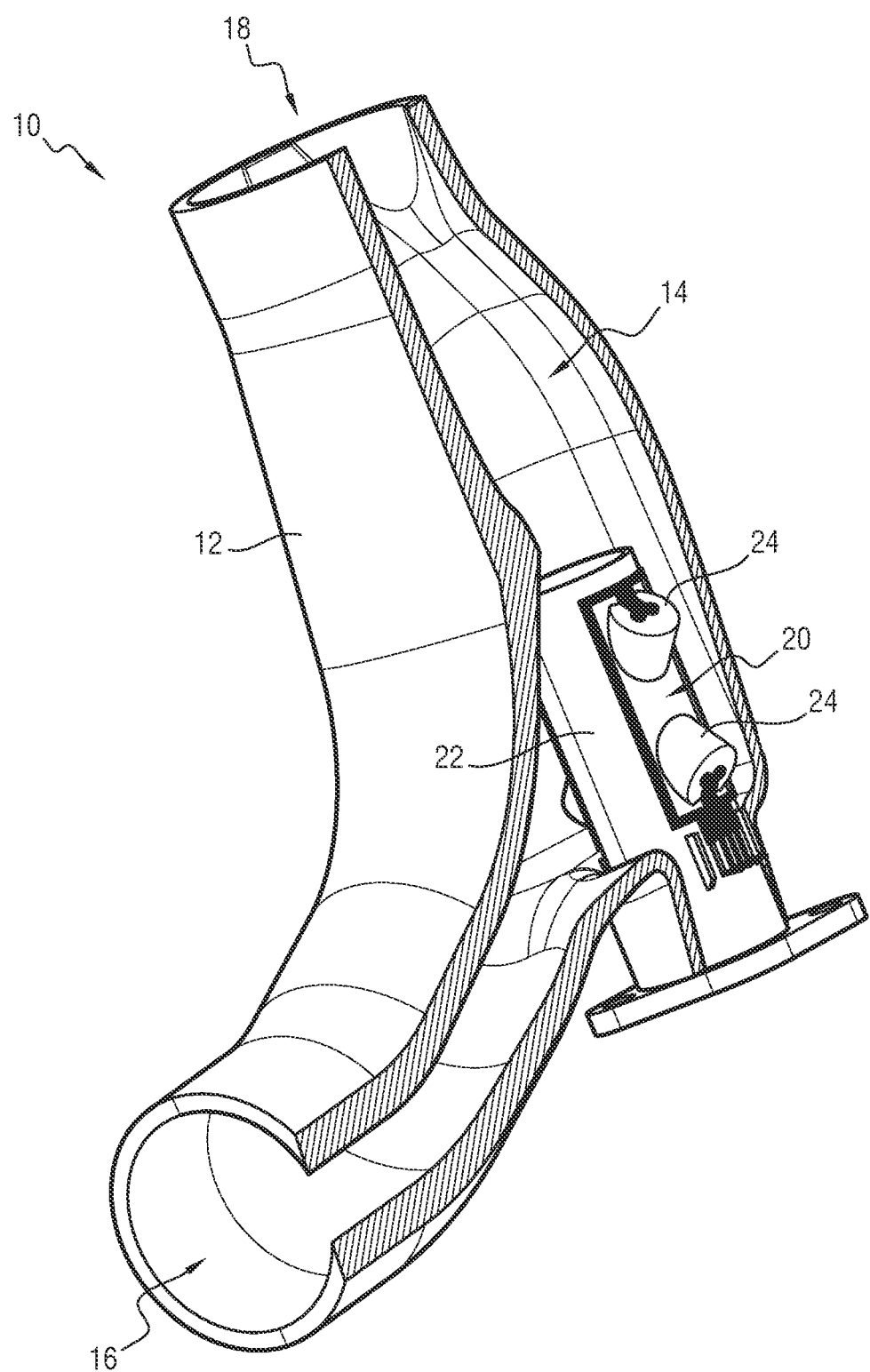
FIG. 1 is a perspective view of a cooling device according to one example embodiment of the disclosure, the case of which is only partially illustrated so as to show the inside of this case.

FIG. 1 shows a cooling device 10 for a flow sensor of recirculated exhaust gases from a heat engine.

The cooling device 10 includes a case 12, delimiting an air circulation enclosure 14.

The case 12 includes an air intake opening 16, which is intended to be connected to an air inlet using upstream pipes 17, and an air outlet opening 18 which is intended to be connected to the heat engine using downstream pipes 19, in order to supply the latter with air. It will be noted that in the present description, the terms "upstream" and "downstream" are considered based on the direction of flow of a fluid, here the air circulating in the enclosure 14.

The cooling device 10 also includes a device 20 for driving exhaust gases, housed at least in part in the enclosure 14. This driving device 20 is intended to equip an exhaust gas recirculation line.

The driving device 20 includes a tubular pipe 22, arranged downstream of recirculation pipes coming from the heat engine. Thus, a portion of the exhaust gases coming from the heat engine is directed toward the driving device 20. As previously indicated, in the present description, the terms "upstream" and "downstream" are considered based on the direction of flow of a fluid. Here, the fluid is the exhaust gases circulating in the tubular pipe 22.

The tubular pipe 22 extends at least partially in the enclosure 14. Thus, this tubular pipe 22 is, for example, fitted in a receiving orifice 23 of this pipe, arranged in the case 12.

The driving device 20 includes at least one exhaust gas flow sensor 24. More particularly, the driving device 20 includes at least two flow sensors 24, preferably four flow sensors 24, arranged to measure a flow rate of exhaust gas circulating in the tubular pipe 22.

The driving device 20 includes power supply elements. More particularly, each sensor 24 is powered by a respective power supply element. These power supply elements are, for example, connected to a general power supply input element, which in turn is intended to be connected to an electricity source.

Advantageously, the flow sensors 24 include at least one ultrasonic transmitter and at least one ultrasonic receiver associated with the ultrasonic transmitter.

More particularly, the flow sensors 24 include two ultrasonic transmitters and two ultrasonic receivers, each associated with a respective one of the ultrasonic transmitters. The transmitters and the receivers therefore form pairs. The transmitter and the receiver of each pair are aligned facing one another, along an axis specific to this pair.

It will be noted that preferably, each sensor 24 is formed by a transducer able to serve as transmitter or receiver.

The transmitter and the receiver of each pair are generally arranged facing one another, on either side of the tubular pipe 22. Thus, the exhaust gases circulate between this transmitter and this receiver. The transmitter emits ultrasounds, which are received by the receiver. The duration between the transmission and the reception depends on the flow of exhaust gas circulating between the transmitter and the receiver. It is thus possible to determine the flow of exhaust gas as a function of this measured duration, in a manner known in itself.

According to the disclosure, each flow sensor 24 is housed entirely in the enclosure 14 of the cooling case 12. "Housed entirely" means that all of the components of the sensor 24 are housed in the enclosure, namely its measuring part and its electronic part. Of course, the sensors 24 remain carried by the tubular pipe 22, in order to measure the flow of gas in this tubular pipe 22.

Advantageously, the tubular pipe 22 includes lateral through openings, through which the sensors 24 pass. Thus, each sensor 24 has an end turned toward the flow of exhaust gas circulating in the tubular pipe 22, and an end protruding outside the tubular pipe 22, in the enclosure 14.

It will be noted that the case 12 is preferably configured to direct the incoming flow of air toward the sensors 24. Thus, the sensors 24 are arranged in the extension of the air intake orifice 16, as shown in FIG. 1.

Figure 2:
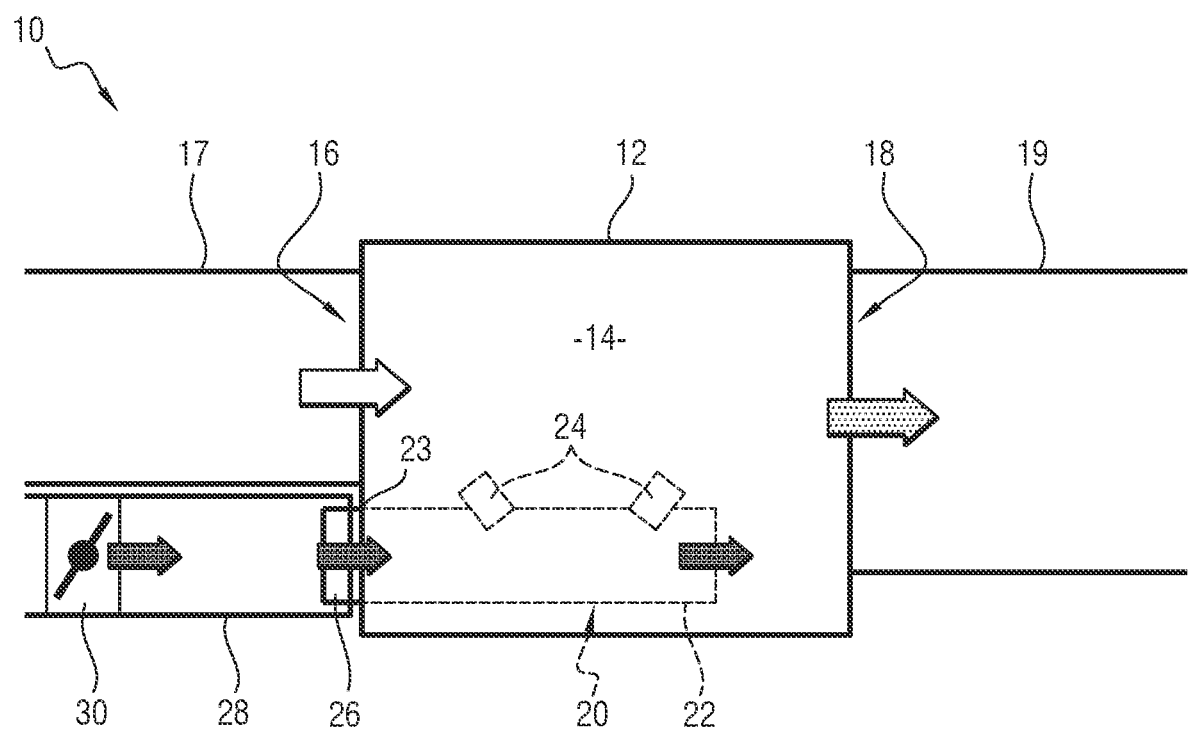
FIG. 2 is a schematic view of the cooling device of FIG. 1.

As in particular shown in FIG. 2, according to the first embodiment, the tubular pipe 22 emerges (at a downstream end) in the enclosure 14. Thus, the recirculated exhaust gas is mixed with the air directly in the enclosure 14 before being sent toward the heat engine.

According to this first embodiment, the tubular pipe 22 is connected, at an upstream end 26, to an exhaust gas intake pipe 28. This connection, is for example, done by fitting the upstream end 26 of the tubular pipe 22 in the intake pipe 28.

It should be noted that the recirculation line conventionally includes a flow regulating valve 30 in order to regulate the flow circulating in the tubular pipe 22. According to this first embodiment, the regulating valve 30 is arranged in the intake pipe 28, upstream of the connection with the tubular pipe 22.

The regulating valve 30 could be arranged in other locations, according to variants that will be described later.

Figure 3:
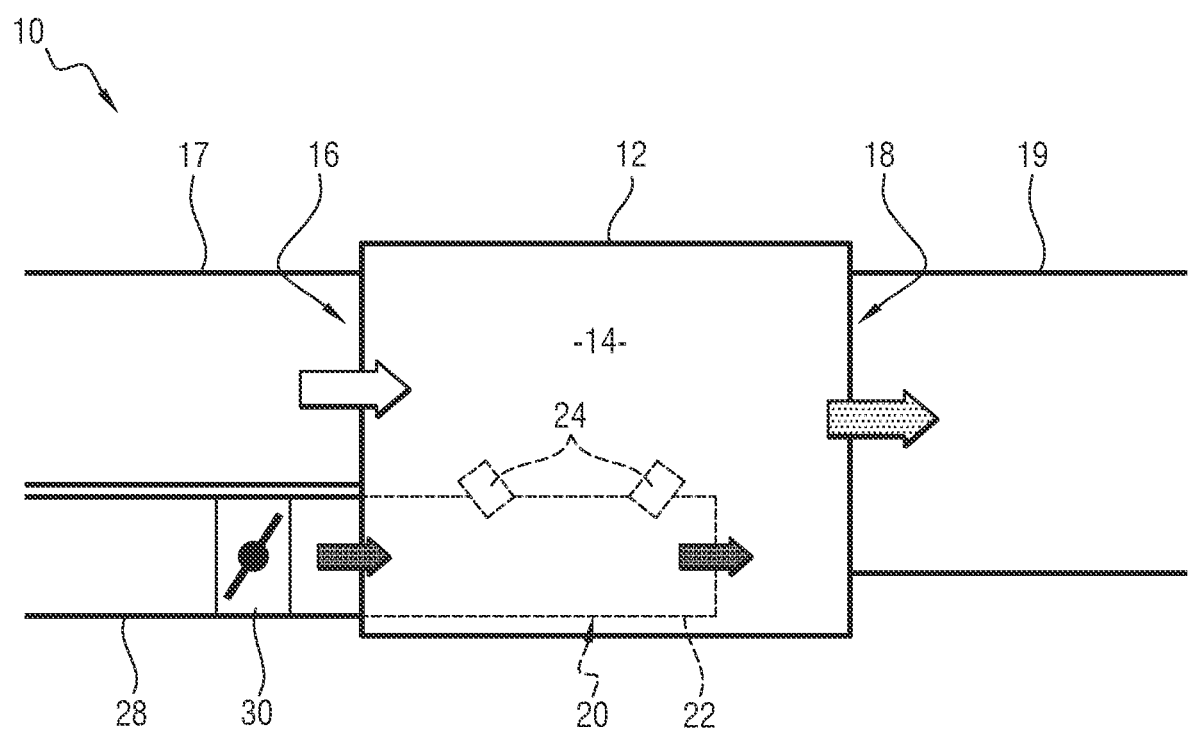
FIG. 3 is a schematic view of a cooling device according to a second example embodiment of the disclosure.

FIG. 3 shows a cooling device 10 according to a second example embodiment. In this figure, the elements that are similar to those of the preceding figures are designated using identical references.

According to this second embodiment, the tubular pipe 22 is secured to the intake pipe 28. For example, the tubular pipe 22 and the intake pipe 28 together form a single pipe in one piece. In a variant, the tubular pipe 22 is welded to the intake pipe 28.

It will be noted that, like in the first embodiment, the tubular pipe 22 opens into the enclosure 14.

Figure 4:
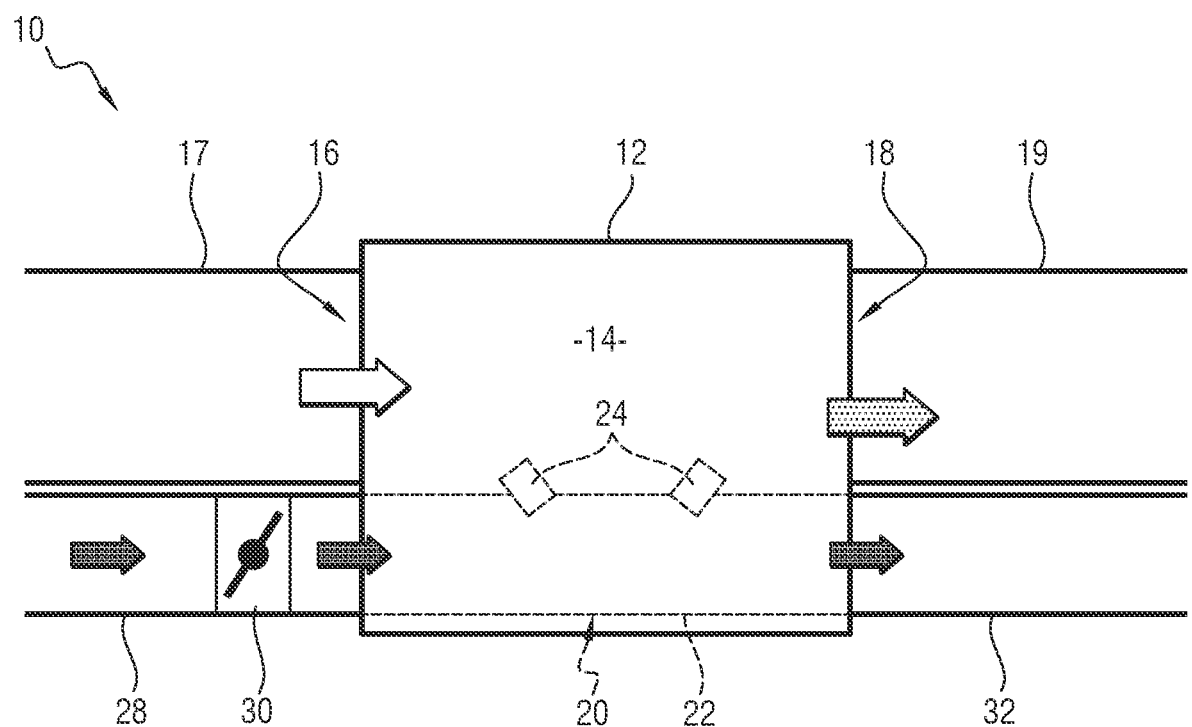
FIG. 4 is a schematic view of a cooling device according to a third example embodiment of the disclosure.

FIG. 4 shows a cooling device 10 according to a third example embodiment. In this figure, the elements that are similar to those of the preceding figures are designated using identical references.

According to this third embodiment, the tubular pipe 22 does not open into the enclosure 14, but passes all the way through it, such that the sensors 24 remain housed in the enclosure 14.

The tubular pipe 22 is then extended by an output pipe 32. This output pipe 32 is intended to open out downstream of the enclosure 14, for example in the downstream pipe 19.

The tubular pipe 22 is, for example, secured to the output pipe 32. For example, the tubular pipe 22 and the output pipe 32 together form a single pipe in one piece. In a variant, the tubular pipe 22 is welded to the output pipe 32.

According to one variant, the tubular pipe 22 could be fitted at its downstream end in the output pipe 32.

Furthermore, according to this third embodiment, the tubular pipe 22 is secured to the intake pipe 28. For example, the tubular pipe 22 and the intake pipe 28 together form a single pipe in one piece. In a variant, the tubular pipe 22 is welded to the intake pipe 28.

According to one variant, the tubular pipe 22 could be fitted at its upstream end in the intake pipe 28.

Figure 5:
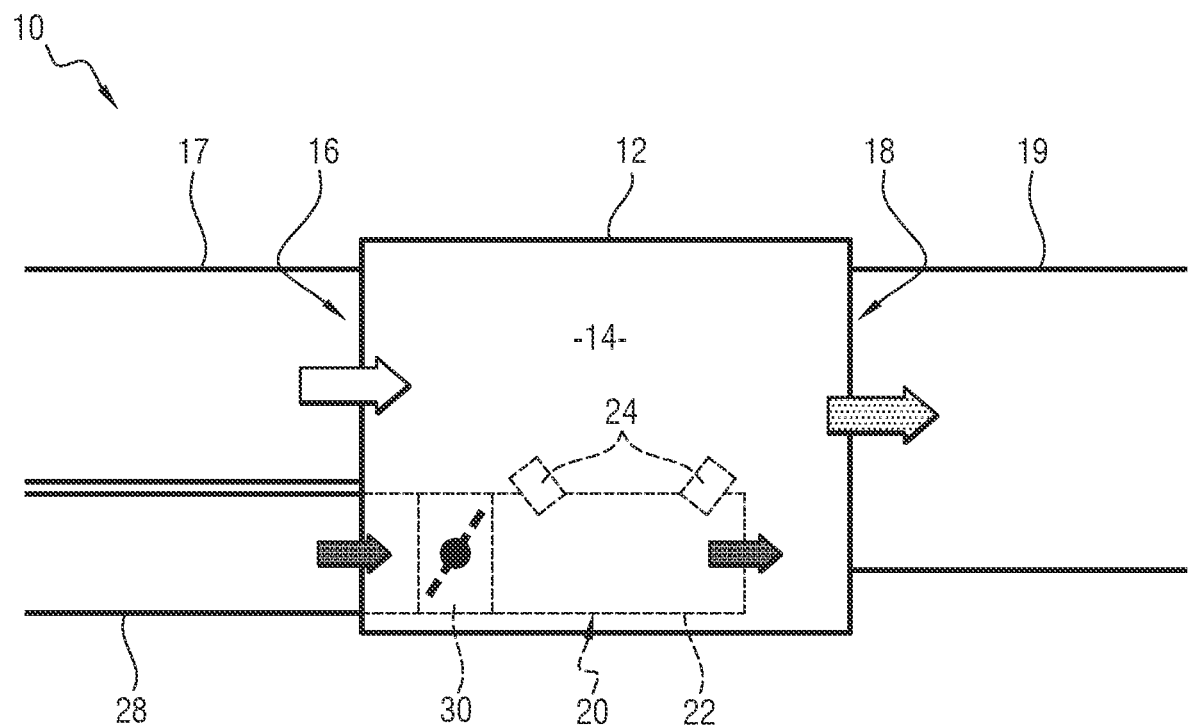
FIG. 5 is a schematic view of a cooling device according to a fourth example embodiment of the disclosure.

FIG. 5 shows a cooling device 10 according to a fourth example embodiment. In this figure, the elements that are similar to those of the preceding figures are designated using identical references.

According to this fourth embodiment, the tubular pipe 22 opens into the enclosure 14, like in the first embodiment.

Furthermore, the regulating valve 30 is housed in the enclosure 14. Thus, the regulating valve 30 is also cooled owing to the air circulating in the enclosure 14.

In this example, the regulating valve 30 is upstream of the flow sensors 24. However, in a variant, the regulating valve 30 could be arranged downstream of the flow sensors 24, in particular at the downstream end of the tubular pipe 22.

In the described example, the tubular pipe 22 is secured to the intake pipe 28 (like in the second embodiment), but in a variant it could be fitted in the intake pipe 28 (like in the first embodiment).

It will be noted that the disclosure is not limited to the embodiments described above, and could assume various conceivable alternatives.

For example, in a variant of the third embodiment, the regulating valve 30 could be arranged downstream of the enclosure 14, on the output pipe 32.

Likewise, in a variant of the third embodiment, the regulating valve 30 could be arranged in the enclosure 14, upstream of the sensors 24 or downstream of these sensors 24.

The invention claimed is:

1. A cooling device for at least one exhaust gas flow sensor for recirculated exhaust gases from a heat engine, the cooling device including:
   a case delimiting an air circulation enclosure, the case comprising an air intake opening intended to be connected to an air inlet, and an air outlet opening intended to be connected to the heat engine; and
   an exhaust gas driving device housed at least partially in the air circulation enclosure, the exhaust gas driving device including the at least one exhaust gas flow sensor, each exhaust gas flow sensor being housed entirely in the air circulation enclosure of the case.

2. The cooling device according to claim 1, wherein each exhaust gas flow sensor is chosen between an ultrasonic transmitter and an ultrasonic receiver.

3. The cooling device according to claim 1, wherein the exhaust gas driving device includes a flow regulating valve, the flow regulating valve being housed inside the air circulation enclosure of the case.

4. The cooling device according to claim 1, wherein the exhaust gas driving device includes a flow regulating valve, the regulating valve being housed outside the air circulation enclosure of the case.

5. The cooling device according to claim 3, wherein the flow regulating valve is arranged upstream of each flow sensor.

6. The cooling device according to claim 3, wherein the flow regulating valve is arranged downstream of each flow sensor.

7. The cooling device according to claim 1, wherein the exhaust gas driving device includes a tubular exhaust gas circulation pipe, which is connected to the case by fitting in a receiving orifice of the tubular exhaust gas circulation pipe.

8. The cooling device according to claim 7, including a downstream pipe connected to the air outlet opening, the tubular exhaust gas circulation pipe passing through the air circulation enclosure and being extended by an outlet pipe opening into the downstream pipe.

9. The cooling device according to claim 7, wherein the tubular exhaust gas circulation pipe opens into the air circulation enclosure.

10. An air intake line, including an air inlet, wherein the air intake line includes the cooling device according to claim 1, the air intake opening of which is connected to the air inlet.

11. The cooling device according to claim 4, wherein the flow regulating valve is arranged upstream of each flow sensor.

12. The cooling device according to claim 4, wherein the flow regulating valve is arranged downstream of each flow sensor.

13. The cooling device according to claim 1, wherein the exhaust gas driving device includes a tubular exhaust gas circulation pipe, and wherein the tubular exhaust gas circulation pipe has an exhaust gas inlet at an upstream end that is configured to be connected to an exhaust gas intake pipe.

14. The cooling device according to claim 13, wherein the at least one exhaust gas flow sensor is directly cooled by air circulating within the case.

15. The cooling device according to claim 14, wherein the tubular exhaust gas circulation pipe includes lateral through openings, through which the at least one sensor passes, and wherein each sensor has an end turned toward a flow of exhaust gas circulating in the tubular exhaust gas circulation pipe and an end protruding outside the tubular exhaust gas circulation pipe such that the end protruding outside the tubular exhaust gas circulation pipe is exposed to cooling air circulating within the air circulation enclosure.

16. The cooling device according to claim 13, wherein a portion of an outer surface of the tubular exhaust gas circulation pipe is directly cooled by air circulating within the case.

17. The cooling device according to claim 13, wherein the air intake opening is intended to be connected to the air inlet using at least one upstream pipe, and wherein the tubular exhaust gas circulation pipe is separate from the at least one upstream pipe, and wherein the exhaust gas intake pipe is separate from the at least one upstream pipe.

* * * * *